(12) United States Patent
Fedronic et al.

(10) Patent No.: US 9,819,725 B1
(45) Date of Patent: Nov. 14, 2017

(54) SYSTEM, METHOD, AND COMPUTER PROGRAM FOR REMOTELY CONTROLLING MOBILE WEB APPLICATIONS INSTALLED ON A MOBILE DEVICE

(71) Applicant: Amdocs Software Systems Limited, Dublin (IE)

(72) Inventors: Valere Fedronic, Rennes (FR); Cedric Gegout, Rennes (FR); Christophe Michel, Chantepie (FR)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 212 days.

(21) Appl. No.: 14/272,334

(22) Filed: May 7, 2014

Related U.S. Application Data (60) Provisional application No. 61/820,723, filed on May 8, 2013.

(51) Int. Cl.
*G06F 15/16* (2006.01)
*H04L 29/08* (2006.01)
*G06F 9/44* (2006.01)

(52) U.S. Cl.
CPC ...... *H04L 67/025* (2013.01); *H04L 29/08099* (2013.01); *G06F 9/4445* (2013.01)

(58) Field of Classification Search
CPC .......... G06F 11/00; G06F 9/44; G06F 9/4445; G07F 17/00; H04L 29/08099; H04L 67/025

USPC ..................... 709/205, 217; 714/38; 719/313
See application file for complete search history.

(56) References Cited

U.S. PATENT DOCUMENTS

| | | | |
|---|---|---|---|
| 8,346,870 B2* | 1/2013 | Jazdzewski | G06F 11/3664 709/205 |
| 8,589,881 B2* | 11/2013 | Park | G06F 11/3664 717/125 |
| 2005/0050159 A1* | 3/2005 | Suraski | G06F 11/362 709/217 |
| 2006/0073785 A1* | 4/2006 | Klassen | H04L 67/02 455/3.01 |
| 2011/0138361 A1* | 6/2011 | McEntee | G06F 8/74 717/125 |
| 2012/0108266 A1* | 5/2012 | Clark | H04W 4/02 455/456.3 |
| 2012/0173966 A1* | 7/2012 | Powell | G06F 17/2247 715/234 |
| 2012/0326851 A1 | 12/2012 | Xu | |

(Continued)

*Primary Examiner* — Dhairya A Patel
(74) *Attorney, Agent, or Firm* — Zilka-Kotab, PC (57) ABSTRACT

A system, method, and computer program product are provided for remotely controlling mobile web applications installed on a mobile device. In use, a web runtime (WRT) controller residing on a mobile device communicates with a remote control system, the remote control system residing on a computing device other than the mobile device, the web runtime controller operative to control a WRT component, the WRT component operative to execute one or more mobile web applications on the mobile device. An address of the web runtime controller is registered with the remote control system. Further, a remote control session of the web runtime controller is initiated on the remote control system, by at least one of the WRT controller or the remote control system.

18 Claims, 5 Drawing Sheets

(56) References Cited

U.S. PATENT DOCUMENTS

2013/0080506 A1* 3/2013 Ng ................... H04L 67/08
709/203
2013/0159779 A1* 6/2013 Mickens ............ G06F 11/3664
714/38.14

* cited by examiner

SYSTEM, METHOD, AND COMPUTER PROGRAM FOR REMOTELY CONTROLLING MOBILE WEB APPLICATIONS INSTALLED ON A MOBILE DEVICE

CLAIM OF PRIORITY

This application claims the benefit of U.S. Provisional Application No. 61/820,723, filed May 8, 2013, the entire contents of which are incorporated herein by reference.

FIELD OF THE INVENTION

The present invention relates generally to mobile web applications, which are applications developed for mobile communicator devices using standard web technologies (e.g. such as HTML5).

BACKGROUND

HTML5 is considered as one of the best and most widely used languages for developing cross-platform mobile applications by packaging web content and executing the content by relying on the existing native device Web Run Time (WRT). However, it still remains difficult to test the behavior of a deployed mobile web application in a production setting, across a wide range of mobile devices, from a central location. Furthermore, security restrictions present in most operating systems prevent the use of standard tools to interact with the web runtime for this purpose.

There is thus a need for addressing these and/or other issues associated with the prior art.

SUMMARY

A system, method, and computer program product are provided for remotely controlling mobile web applications installed on a mobile device. In use, a web runtime (WRT) controller residing on a mobile device communicates with a remote control system, the remote control system residing on a computing device other than the mobile device, the web runtime controller operative to control a WRT component, the WRT component operative to execute one or more mobile web applications on the mobile device. An address of the web runtime controller is registered with the remote control system. Further, a remote control session of the web runtime controller is initiated on the remote control system, by at least one of the WRT controller or the remote control system.

DETAILED DESCRIPTION

Figure 1:
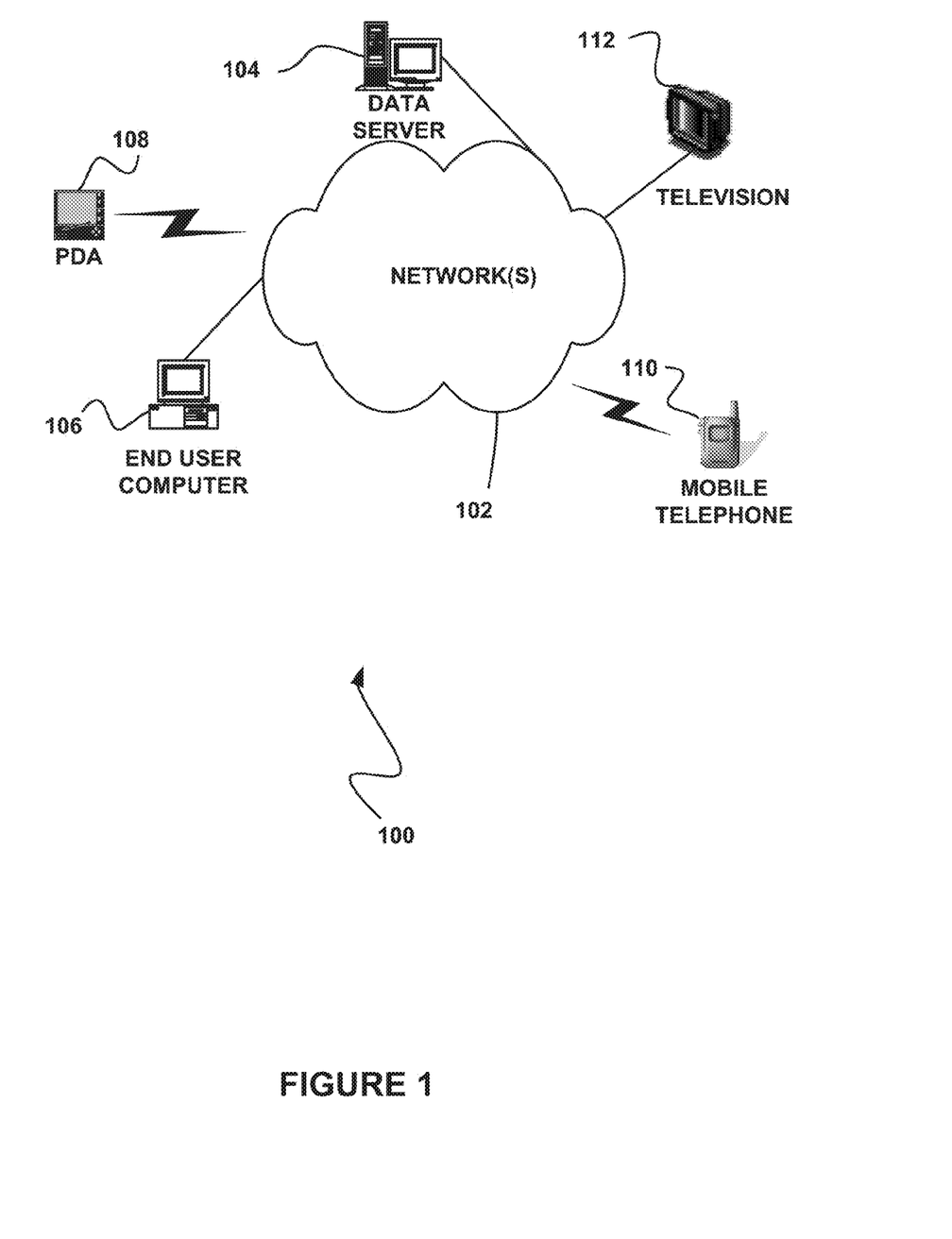
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
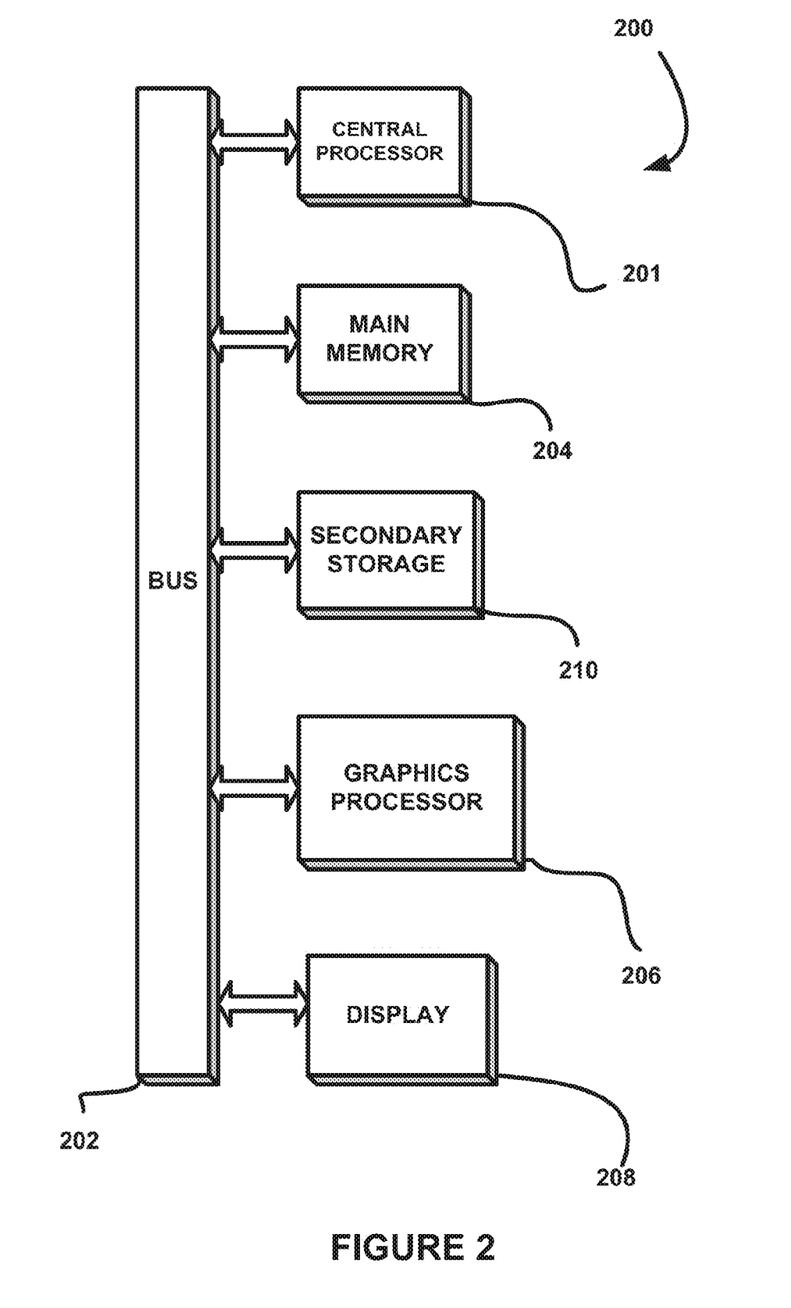
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
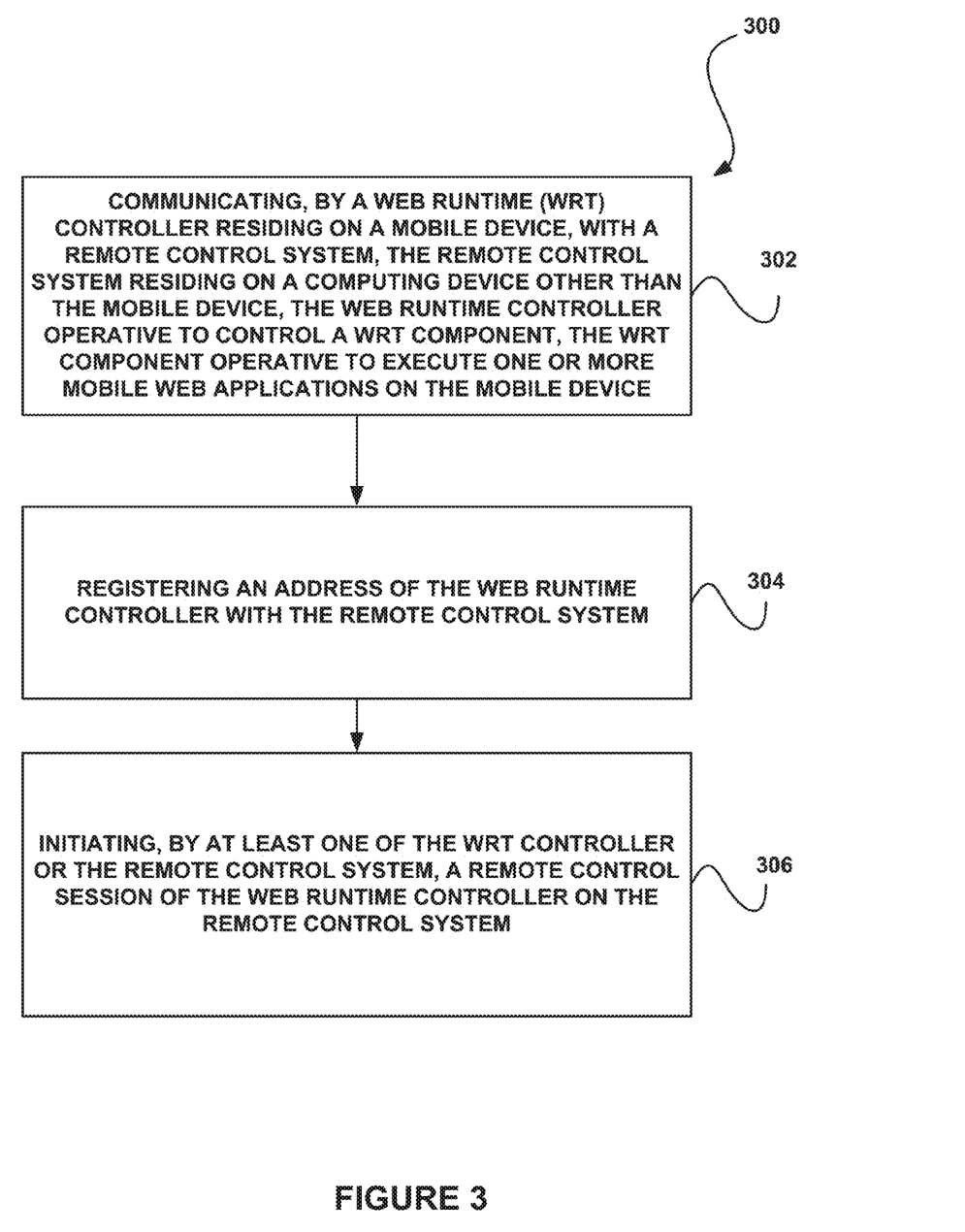
FIG. 3 illustrates a method for remotely controlling mobile web applications installed on a mobile device, in accordance with one embodiment.

FIG. 3 illustrates a method 300 for remotely controlling mobile web applications installed on a mobile device, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

In use, a web runtime (WRT) controller residing on a mobile device communicates with a remote control system, the remote control system residing on a computing device other than the mobile device, and the web runtime controller being operative to control a WRT component. Additionally, the WRT component is operative to execute one or more mobile web applications on the mobile device. See operation 302.

The mobile device may include any type of device. For example, in various embodiments, the mobile device may include a mobile phone, a tablet computer, a handheld computer, etc.

Furthermore, the computing device wherein the remote control system resides may include any type of computing device. For example, in various embodiments, the computing device may include a network server computer, a mobile device, a desktop computer, a laptop computer, a tablet computer, and/or any other computing device.

As shown further in FIG. 3, an address of the web runtime controller is registered with the remote control system. See operation 304. In one embodiment, the address may include an IP address. In another embodiment, the address may include a port address.

Further, a remote control session of the web runtime controller is initiated on the remote control system, by at least one of the WRT controller or the remote control system. See operation 306. The remote control session may be run from any type of computing device. For example, in various embodiments, the remote control session may be run from a network server computer, a mobile device, a desktop computer, a laptop computer, a tablet computer, and/or any other computing device.

In one embodiment, the method 300 may further include retrieving, by the web runtime controller, information associated with at least one of the one or more mobile web applications controlled by the WRT controller of the mobile device. In this case, the information associated with the one or more mobile web applications may be sent to the remote control system (or to the computing system associated therewith, etc.).

Additionally, in one embodiment, at least one control message designated to be executed by at least one of the one or more mobile web applications controlled by the WRT controller of the mobile may be sent to the WRT controller of the mobile device by the remote control system. In response, the WRT controller of the mobile device may cause the control message to be executed by the one or more mobile web applications.

Further, in one embodiment, the method 300 may include receiving a request for control of the one or more mobile web applications on the mobile device. In one embodiment, the request for control of the one or more mobile web applications on the mobile device may be received from the remote control system.

In addition, a response to the request for control of the one or more mobile web applications may be received. In this case, the response to the request for control of the one or more mobile web applications may be received from a user of the mobile device.

Furthermore, in one embodiment, the WRT controller may check to determine whether the remote control system is willing and/or able to take control of the one or more mobile web applications on the mobile device. In this case, the WRT controller may check to determine whether the remote control system is willing to take control of the one or more mobile web applications on the mobile device in response to executing the one or more mobile web applications on the mobile device. In another embodiment, the WRT controller may check to determine whether the remote control system is willing to take control of the one or more mobile web applications on the mobile device in response to a user action on the mobile device.

Still yet, in one embodiment, the mobile device may include receiving state information from the remote control system to share contextual data. In one embodiment, the state information may include a Document Object Model (DOM) tree. In another embodiment, the state information may include an image. Of course, the state information may include any information associated with the state.

Further, in one embodiment, the method 300 may include receiving control messages at the mobile device, from the remote control system. In various embodiments, the control messages may be associated with button clicking, form filling, screen pressing, and/or any other user action.

Utilizing the method 300, an operator may take control of a mobile web application running on a customer's mobile device from a remote system such as, for example, a desktop/laptop computer, allowing the operator to drive the application and control its execution.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
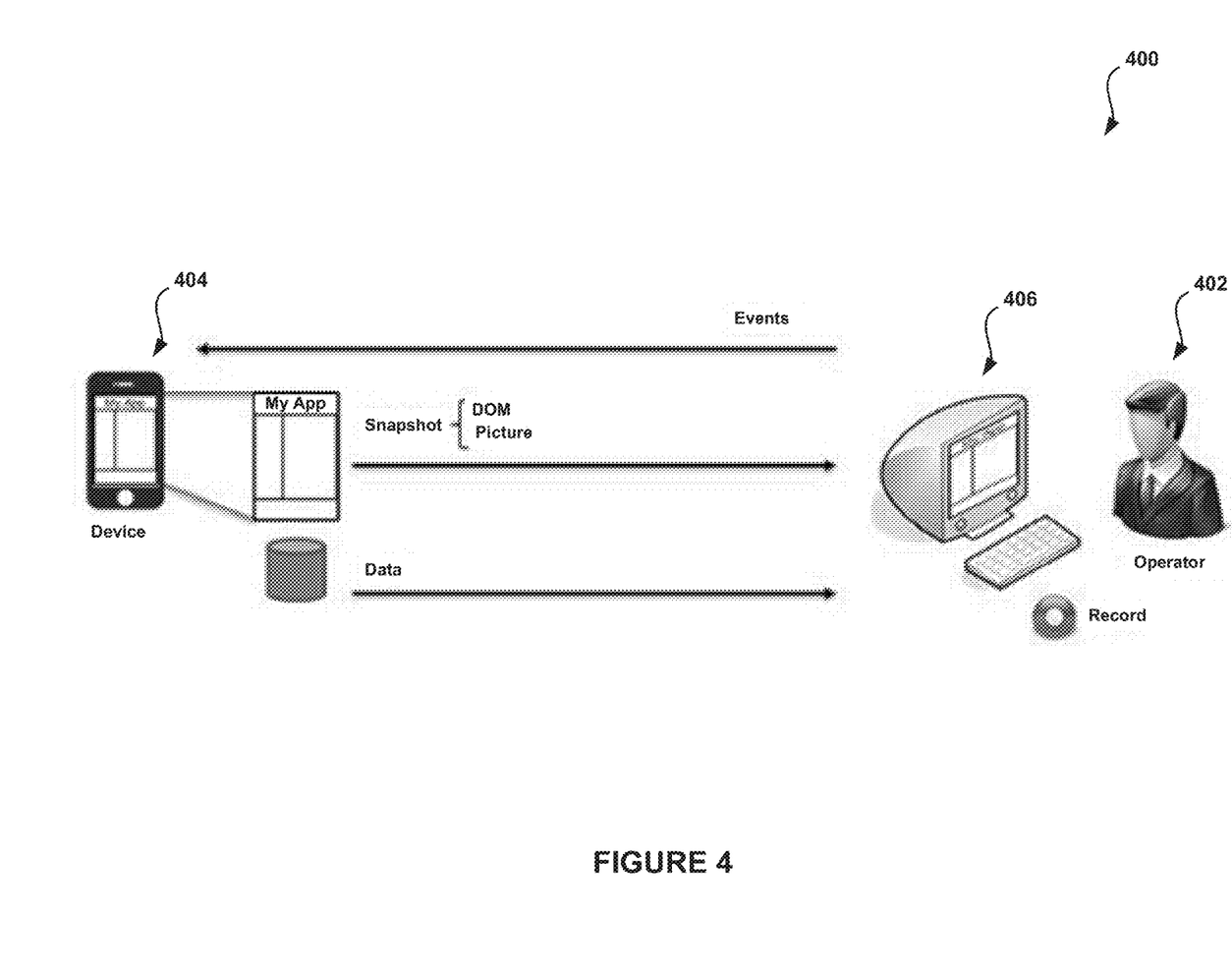
FIG. 4 illustrates a system flow diagram between an operator and a remotely controlled mobile web application, in accordance with one embodiment.

FIG. 4 illustrates a system flow diagram 400 between an operator and a remotely controlled mobile web application, in accordance with one embodiment. As an option, the flow diagram 400 may be implemented in the context of the details of FIGS. 1-3. Of course, however, the flow diagram 400 may be implemented in the context of any desired environment. Further, the aforementioned definitions may equally apply to the description below.

As shown, a system may function to allow an operator 402 to take control of a mobile web application running on a customer's mobile device 404 from a remote system 406 such as, for example, a desktop/laptop computer and mobile communicator devices, allowing the operator 402 to drive the application and to control its execution.

Using the remote control system, the operator 402 may request control of a mobile web application. Additionally, an end-user of the mobile device 404 hosting the mobile web application can decide whether to grant the operator's request for control over the mobile web application. Once the operator has control of the application, the operator 402 can trigger operations or raise events on the mobile web application.

In one embodiment, the operator 402 may also create or record a sequence/scenario of such operations or events that can be triggered together on an end user's device, allowing a standard scenario to be quickly and easily repeated across multiple end users' devices. Additionally, the operator 402 may retrieve useful information from the mobile web application. For example, the operator may retrieve the state or context of the application, the application's DOM structure, a screenshot of what the application currently looks like on the end user's device, or any information describing what has been performed on the device, such as application history or operation traceability.

Various use-cases can be addressed using such a remote control system. For example, in the context of assistance, an end-user may grant mobile web application control to an operator. The operator 402 may then perform necessary operations on the mobile web application on behalf of the end-user. Such processes may include, for example, an end procedure or restoring the application in a safe state. Further, the operator 402 can assist multiple end-users running corresponding application instances, from a central system.

As another example, in the context of testing, a developer may take control of a mobile web application on a mobile device, as a secondary screen. Additionally, the developer may take simultaneous control of multiple devices running corresponding multiple mobile web application instances. Furthermore, mobile devices may be shared among multiple developers.

Figure 5:
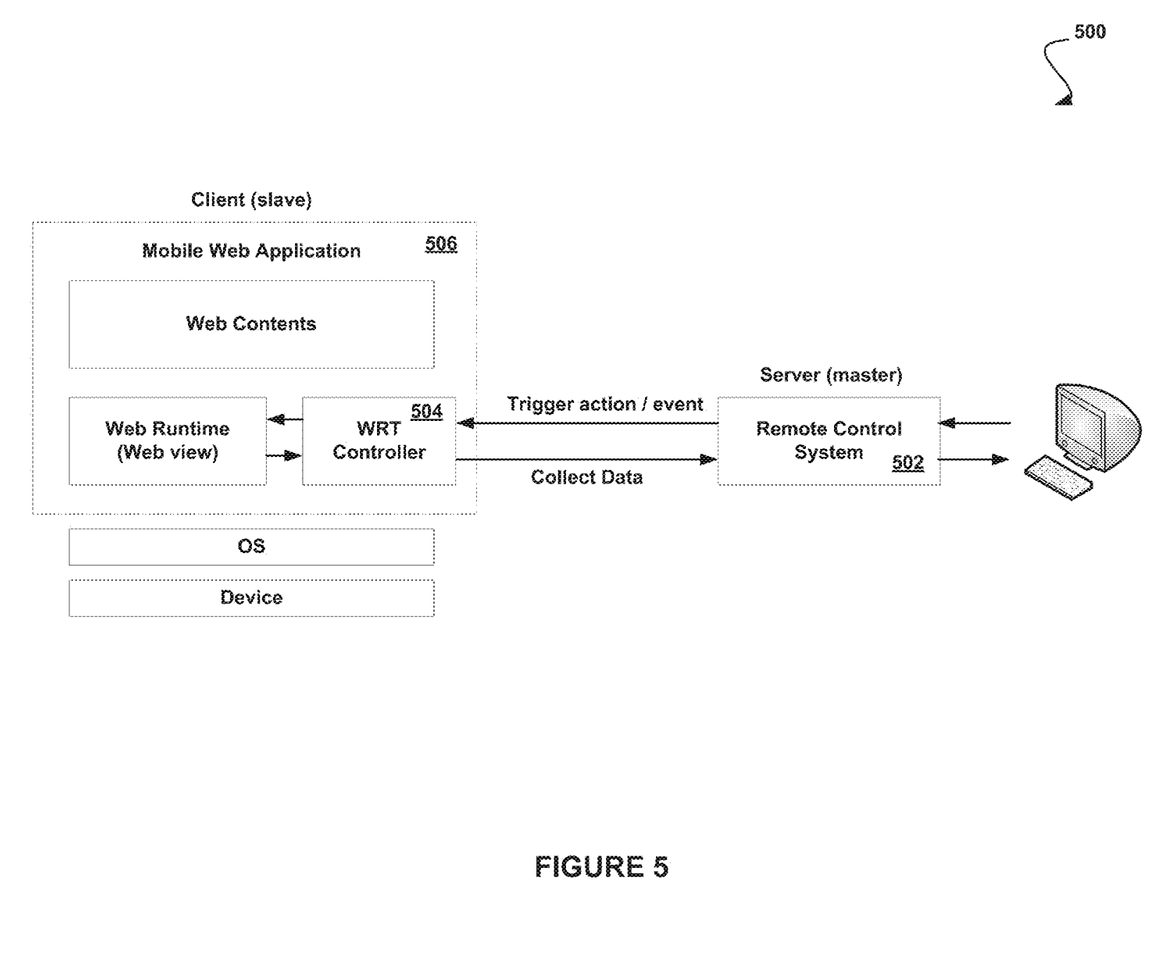
FIG. 5 illustrates a system for remotely controlling mobile web applications installed on a mobile device, in accordance with one embodiment.

FIG. 5 illustrates a system 500 for remotely controlling mobile web applications installed on a mobile device, in accordance with one embodiment. As an option, the system 500 may be implemented in the context of the details of FIGS. 1-4. Of course, however, the system 500 may be implemented in the context of any desired environment. Further, the aforementioned definitions may equally apply to the description below.

As shown in FIG. 5, the system 500 includes, on a server-side, a remote control system 502. The remote control system 502 includes a central system for taking control over a mobile web application 506, triggering actions or events, and collecting useful data.

On a client-side, the system 500 includes a Web Runtime (WRT) controller 504. The WRT 504 includes a component installed as part of the mobile web application 506 in order to enable the end user to grant control, and to enable an operator to take control and drive the mobile web application 506.

In one embodiment, the process of packaging the mobile web application 506 in order to enable the remote control capability may include declaring the application on the remote control system 502 and obtaining an access key. In another embodiment, the process of packaging the mobile web application in order to enable the remote control capability 506 may include using a mobile web application development environment SDK to package the application, including the access key, with remote control facilities enabled by integrating the WRT controller 504.

In one embodiment, the system 500 may allow for mobile platform agnosticism. For example, the application may be built once and control may be taken on whatever device on which the application is deployed.

Furthermore, the system 500 may allow for application independence. For example, no special code needs to be added to the mobile web application 506 to support remote control. All functionality may be in the web runtime controller 504.

The system 500 also ensures application safety. For example, the system 500 does not require changing or modifying the application 506, and thus does not interfere with the application runtime and does not negatively impact on the end user's experience with that application.

Additionally, the system 500 may have a mobile web application focus. For example, the WRT controller 504, not being part of the mobile web application 506 and thus having restrictions associated therewith, allows for tighter integration with existing native mobile OS Web Run Time and allows the internal application context to be retrieved. This is not possible with standard screen sharing applications.

Furthermore, the system 500 may include a production ready system. For example, the system 500 may function to allow taking control of the application on real end-user devices, while currently available solutions only provide functionality for application development in the debugging stage.

The mobile web application 506 should be enabled for remote control, and therefore should be packaged with the SDK, thereby embedding the WRT controller 504. The mobile web application 506 should also include a URL of the trusted remote control system 502 and authentication information should be sent thereto.

At start up, and periodically while running, the WRT controller 504 on the mobile device may connect to the remote control system 502 and register its IP address and communication port. Furthermore, the remote control system 502 may listen on this IP/port for incoming requests from the remote control system 502. This connection may be implemented over an IP network and may be implemented with secured communication channel (e.g. such as SSH and HTTPS, etc.).

Remote control can then be initiated either by the mobile web application 506 or by the remote control system 502. For example, the WRT controller 504 may check, either at launch or in a suitable context such as a particular user action, whether the remote control system 502 is willing to take control.

As another example, the remote control system 502 may directly initiate the connection using the previously registered IP/port of the device and send a connection request to the device. If the WRT Controller 504 is accessible, it will receive this request and will prompt to the user to grant or reject remote access to the requester.

Additionally, in one embodiment, the remote control system 502 may send a push notification, which is a device specific notification mechanism [e.g. such as an Apple® or Google® push notification system (APNS/GCM), etc.] to the WRT controller 504 to initiate a connection request to the remote control system 502.

In any case, the remote control system 502 may check to determine whether the WRT controller 504 is properly authenticated. Once remote control has been initiated, this creates a 2-way communication allowing the WRT controller 504 to send state information such as a DOM tree, and/or an image/snapshot to the remote control system 502 to share contextual data. Additionally, the WRT controller 504 may receive control messages, such as button clicking, form filling and screen pressing, from the remote control system 502 to enable remote control action.

This connection may be operated over an IP network and may be implemented with several secured communication channels, such as SSH and HTTPS. Additionally, if the application is not running on the device, the remote control system 502 may send a push notification (e.g. such as an iPhone™ notification, etc.) to launch the application and to initiate above connection.

Accordingly, utilizing the system 500, an operator may take control of a mobile web application running on a customer's mobile device from a remote system such as, for example, a desktop/laptop computer, allowing the operator to drive the application and control its execution.

Traditional debugger solutions are only applicable at the development stage of the mobile Web application, and do not support remote control of the final application deployed in the marketplace, as software providers do not want to package their mobile web applications in debug mode. As a consequence, such technology is not applicable for remote assistance. This system 500 enables remote assistance without the requirement to ship the mobile web application in debug mode.

Additionally, traditional device remote control solutions, such as VNC, allow control of the mobile device itself at the mobile OS level through screen sharing. These solutions do not provide control at the application level. Therefore they are not capable of accessing or affecting the internal application state or retrieving the execution context of the application. Moreover these remote control solutions require special software to be installed on the device or request OS level permissions that may not always be authorized or possible. The system 500 allows for a controller to be integrated into the Web Runtime and thus does not require any additional software to be installed or special permissions to be granted.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, including code executable by a processor to perform a method comprising:
communicating, by a web runtime (WRT) controller residing on a mobile device, with a remote control system, the remote control system residing on a computing device other than the mobile device, the WRT controller embedded in a mobile web application on the mobile device and the WRT controller including a WRT component operative to execute the mobile web application on the mobile device;
registering an address of the WRT controller with the remote control system;
sending, by the WRT controller, authentication information to the remote control system for authenticating the WRT controller;
initiating, by the WRT controller, a remote control session of the WRT controller on the remote control system;
controlling execution of the mobile web application, using a series of control messages received by the WRT controller from the remote control system, including:
receiving, by the WRT controller from the remote control system via the session, the series of control messages designated to be executed by the mobile web application for driving execution of the mobile web application, wherein the remote control system determines whether the WRT controller is properly authenticated prior to sending the control message to the WRT controller, and causing, by the WRT controller, the series of control messages to be executed by the mobile web application such that execution of the mobile web application is driven using the series of control messages received from the remote control system,
wherein an operator of the remote control system drives the execution of the mobile web application by triggering operations on the mobile web application through the series of control messages, and
wherein a sequence of the operations is recorded for use in controlling other end user devices; and
sending, by the WRT controller, state information for the mobile web application to the remote control system.

2. The computer program product of claim 1, further comprising receiving a request for control of the mobile web application on the mobile device.

3. The computer program product of claim 2, wherein the computer program product is operable such that the request for control of the mobile web application on the mobile device is received from the remote control system.

4. The computer program product of claim 3, further comprising receiving a response to the request for control of the mobile web application.

5. The computer program product of claim 4, wherein the computer program product is operable such that the response to the request for control of the mobile web application is received from a user of the mobile device.

6. The computer program product of claim 1, wherein the computer program product is operable such that the WRT controller checks to determine whether the remote control system is willing to take control of the mobile web application on the mobile device.

7. The computer program product of claim 6, wherein the computer program product is operable such that the WRT controller checks to determine whether the remote control system is willing to take control of the mobile web application on the mobile device in response to executing the mobile web application on the mobile device.

8. The computer program product of claim 6, wherein the computer program product is operable such that the WRT controller checks to determine whether the remote control system is willing to take control of the mobile web application on the mobile device in response to a user action on the mobile device.

9. The computer program product of claim 1, wherein the state information includes a Document Object Model (DOM) tree.

10. The computer program product of claim 1, wherein the computer program product is operable such that the remote control system resides on a network server.

11. The computer program product of claim 1, wherein registering the address of the WRT controller with the remote control system includes registering an IP address and communication port of the WRT controller with the remote control system such that the IP address and the communication port are used for communications between the WRT controller and the remote control system.

12. The computer program product of claim 1, wherein the series of control messages represent user actions associated with a graphical user interface of the mobile web application.

13. The computer program product of claim 1, wherein the user actions include button clicking and form filling.

14. The computer program product of claim 1, wherein the state information includes a screen shot of a display of the mobile web application running on the mobile device.

15. The computer program product of claim 1, wherein the state information includes a history of operations performed by the mobile web application.

16. The computer program product of claim 1, wherein the WRT controller is embedded in the mobile web application to enable the execution of the mobile web application to be controlled, such that additional software is not required to be installed on the mobile device to enable the execution of the mobile web application to be controlled.

17. A method, comprising:
communicating, by a web runtime (WRT) controller residing on a mobile device, with a remote control system, the remote control system residing on a computing device other than the mobile device, the WRT controller embedded in a mobile web application on the mobile device and the WRT controller including a WRT component operative to execute the mobile web application on the mobile device;
registering an address of the WRT controller with the remote control system;
sending, by the WRT controller, authentication information to the remote control system for authenticating the WRT controller;
initiating, by the WRT controller, a remote control session of the WRT controller on the remote control system;

controlling execution of the mobile web application, using a series of control messages received by the WRT controller from the remote control system, including:
receiving, by the WRT controller from the remote control system via the session, the series of control messages designated to be executed by the mobile web application for driving execution of the mobile web application, wherein the remote control system determines whether the WRT controller is properly authenticated prior to sending the control message to the WRT controller, and causing, by the WRT controller, the series of control messages to be executed by the mobile web application such that execution of the mobile web application is driven using the series of control messages received from the remote control system,
wherein an operator of the remote control system drives the execution of the mobile web application by triggering operations on the mobile web application through the series of control messages, and
wherein a sequence of the operations is recorded for use in controlling other end user devices; and
sending, by the WRT controller, state information for the mobile web application to the remote control system.

18. A system comprising:
a memory system; and
one or more processing cores coupled to the memory system and that are each configured to:
communicate, by a web runtime (WRT) controller residing on a mobile device, with a remote control system, the remote control system residing on a computing device other than the mobile device, the WRT controller embedded in a mobile web application on the mobile device and the WRT controller including a WRT component operative to execute the mobile web application on the mobile device;
register an address of the WRT controller with the remote control system;
send, by the WRT controller, authentication information to the remote control system for authenticating the WRT controller;
initiate, by the WRT controller, a remote control session of the WRT controller on the remote control system;
control execution of the mobile web application, using a series of control messages received by the WRT controller from the remote control system, including:
receive, by the WRT controller from the remote control system via the session, the series of control messages designated to be executed by the mobile web application for driving execution of the mobile web application, wherein the remote control system determines whether the WRT controller is properly authenticated prior to sending the control message to the WRT controller, and cause, by the WRT controller, the series of control messages to be executed by the mobile web application such that execution of the mobile web application is driven using the series of control messages received from the remote control system,
wherein an operator of the remote control system drives the execution of the mobile web application by triggering operations on the mobile web application through the series of control messages, and
wherein a sequence of the operations is recorded for use in controlling other end user devices; and
send, by the WRT controller, state information for the mobile web application to the remote control system.

* * * * *